US009744833B2

(12) United States Patent
Uchida et al.

(10) Patent No.: US 9,744,833 B2
(45) Date of Patent: Aug. 29, 2017

(54) SUNROOF APPARATUS

(71) Applicant: AISIN SEIKI KABUSHISIKI KAISHA, Kariya-shi, Aichi-ken (JP)

(72) Inventors: Kinju Uchida, Kariya (JP); Katsutoshi Kato, Ana-gun (JP); Yoshitaka Nakamura, Nagoya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/229,617

(22) Filed: Aug. 5, 2016

(65) Prior Publication Data
US 2017/0050500 A1    Feb. 23, 2017

(30) Foreign Application Priority Data

Aug. 7, 2015   (JP) .................................. 2015-157319
Jun. 21, 2016   (JP) .................................. 2016-122790

(51) Int. Cl.
*B60J 7/22*     (2006.01)
*B60J 7/043*    (2006.01)

(52) U.S. Cl.
CPC  *B60J 7/043* (2013.01); *B60J 7/22* (2013.01)

(58) Field of Classification Search
CPC .......................................................... B60J 7/22
USPC ....................................................... 296/217
See application file for complete search history.

(56) References Cited

U.S. PATENT DOCUMENTS

| | | | | |
|---|---|---|---|---|
| 5,484,184 A * | 1/1996 | Kohlpaintner | ......... | B60J 7/0046 296/214 |
| 7,862,109 B2 * | 1/2011 | Geerets | ................... | B60J 7/0046 296/217 |
| 8,220,868 B2 * | 7/2012 | Fraley | .................... | B60J 7/0046 160/84.04 |
| 9,233,600 B2 * | 1/2016 | Nellen | ................... | B60J 7/0435 |

FOREIGN PATENT DOCUMENTS

JP          2011-93471          5/2011

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A sunroof apparatus includes: a movable panel adapted to open and close an opening formed in a roof of a vehicle; a guide rail provided in each edge portion of the opening in a width direction of the vehicle such that the guide rail is positioned below the movable panel in a height direction of the vehicle; an attachment member fixed to the movable panel, including a flange extending toward an interior side in the width direction in each edge portion in the width direction, in which an attachment recessed portion is formed in the flange; and a shielding body including interposing pieces which are provided to extend in a forward and rearward direction of the vehicle, slidably engaged with the guide rail, and extending in the width direction of the vehicle while being spaced away from each other in the height direction of the vehicle.

5 Claims, 5 Drawing Sheets

VEHICLE INTERIOR SIDE ←→ VEHICLE EXTERIOR SIDE
WIDTH
DIRECTION

VEHICLE INTERIOR SIDE ←WIDTH DIRECTION→ VEHICLE EXTERIOR SIDE

VEHICLE INTERIOR SIDE ←WIDTH DIRECTION→ VEHICLE EXTERIOR SIDE

VEHICLE INTERIOR SIDE ⟵⟶ VEHICLE EXTERIOR SIDE
WIDTH
DIRECTION

VEHICLE INTERIOR SIDE ←⎯→ VEHICLE EXTERIOR SIDE
WIDTH
DIRECTION

VEHICLE INTERIOR SIDE ←―→ VEHICLE EXTERIOR SIDE
WIDTH DIRECTION

VEHICLE INTERIOR SIDE ←―→ VEHICLE EXTERIOR SIDE
WIDTH DIRECTION

SUNROOF APPARATUS

CROSS REFERENCE TO RELATED APPLICATIONS

This application is based on and claims priority under 35 U.S.C. §119 to Japanese Patent Application 2015-157319 filed on Aug. 7, 2015 and Japanese Patent Application 2016-122790 filed on Jun. 21, 2016, the entire contents of which are incorporated herein by reference.

TECHNICAL FIELD

This disclosure relates to a sunroof apparatus.

BACKGROUND DISCUSSION

A sunroof apparatus in the related art is disclosed in JP 2011-93471A (Reference 1) (refer to paragraphs [0028] and [0029] and FIGS. 2 and 6). The sunroof apparatus includes a shielding body (side garnish), of which an upper end side is attached to each edge portion of a movable panel, which opens and closes an opening formed in a roof of a vehicle, in a width direction of the vehicle, and of which a lower end side is slidably engaged with a long guide portion disposed in each edge portion of the opening in the width direction of the vehicle. The shielding body shields an operation mechanism of the sunroof apparatus from a vehicle interior side. During an opening and closing operation of the movable panel, the shielding body is moved together with the movable panel while being slid against the guide portion.

FIGS. 8A and 8B are sectional views illustrating the structure of attachment between the upper end side of the shielding body and each edge portion of the movable panel in the width direction of the vehicle according to Reference 1. As illustrated in FIGS. 8A and 8B, an attachment panel 93 is fixed to a lower surface of a movable panel 91, and includes a flange 92 extending toward an interior side in the width direction in each edge portion in the width direction of the vehicle. A cut and lifted piece 94 is formed in the flange 92 such that the cut and lifted piece 94 is cut and lifted obliquely upward from an interior side portion of the flange 92 in the width direction of the vehicle.

In contrast, an upper end portion of a shielding body 95 includes a pair of interposing pieces 96 and 97 which extend toward an exterior side in the width direction of the vehicle and between which the flange 92 is interposed in a height direction of the vehicle. A retaining claw 98 is formed at a tip end (exterior side end in the width direction of the vehicle) of one side interposing piece 96 positioned on an upper side in the height direction of the vehicle such that the retaining claw 98 protrudes downward in the height direction of the vehicle and is latched onto a tip end surface (exterior side end surface in the width direction of the vehicle) 94a of the cut and lifted piece 94.

Since the flange 92 is interposed between both the interposing pieces 96 and 97 in the height direction of the vehicle, and the retaining claw 98 is latched onto the tip end surface 94a of the cut and lifted piece 94, the upper end portion of the shielding body 95 is retained by and fixed to the flange 92.

A gap C is formed between both the interposing pieces 96 and 97 and the flange 92 due to a variation in the accuracy of components. For this reason, if the attachment posture is changed, for example, during a tilt-up operation of the movable panel 91, as illustrated in FIG. 8B, a latch allowance between the tip end surface 94a of the cut and lifted piece 94 and the retaining claw 98 in the height direction of the vehicle is reduced, and the upper end portion of the shielding body 95 may be dislocated from the flange 92.

SUMMARY

Thus, a need exists for a sunroof apparatus which is not suspectable to the drawback mentioned above.

A sunroof apparatus according to an aspect of this disclosure includes: a movable panel adapted to open and close an opening formed in a roof of a vehicle; a guide rail which is provided in each edge portion of the opening in a width direction of the vehicle such that the guide rail is positioned below the movable panel in a height direction of the vehicle; an attachment member which is fixed to the movable panel, includes a flange extending toward an interior side in the width direction in each edge portion in the width direction of the vehicle, in which an attachment recessed portion, which is recessed in the height direction of the vehicle, is formed in the flange; and a shielding body that includes a pair of interposing pieces which are provided to extend in a forward and rearward direction of the vehicle, are slidably engaged with the guide rail, and extend in the width direction of the vehicle while being spaced away from each other in the height direction of the vehicle, and between which the flange is interposed, and a connection wall through which respective interior side ends of both of the interposing pieces in the width direction of the vehicle are connected to each other in the height direction of the vehicle, and in which a retaining claw is formed in a tip end portion of a first interposing piece, which is one of both of the interposing pieces, such that the retaining claw protrudes in the height direction of the vehicle and is latched onto an inner wall surface of the attachment recessed portion. In a sectional view, the shielding body is in contact with the flange at two points on the first interposing piece and at one point positioned in a middle area between the two points in the width direction of the vehicle on a second interposing piece which is the other of both of the interposing pieces.

BRIEF DESCRIPTION OF THE DRAWINGS

The foregoing and additional features and characteristics of this disclosure will become more apparent from the following detailed description considered with the reference to the accompanying drawings, wherein:

FIG. 8A illustrates an original attachment posture, and FIG. 8B illustrates a changed attachment posture.

DETAILED DESCRIPTION

First Embodiment

Hereinafter, a sunroof apparatus of a first embodiment will be described. Hereinafter, a "forward and rearward direction" refers to a forward and rearward direction of a vehicle. An "upper side" and a "lower side" respectively refer to the upper side and the lower side of the vehicle in a height direction of the vehicle. In addition, a "vehicle interior side" refers to the inside of the vehicle in a width direction of the vehicle, which indicates a passenger compartment side. A "vehicle exterior side" refers to the outside of the vehicle in the width direction, which indicates the outside of a passenger compartment.

Figure 1:
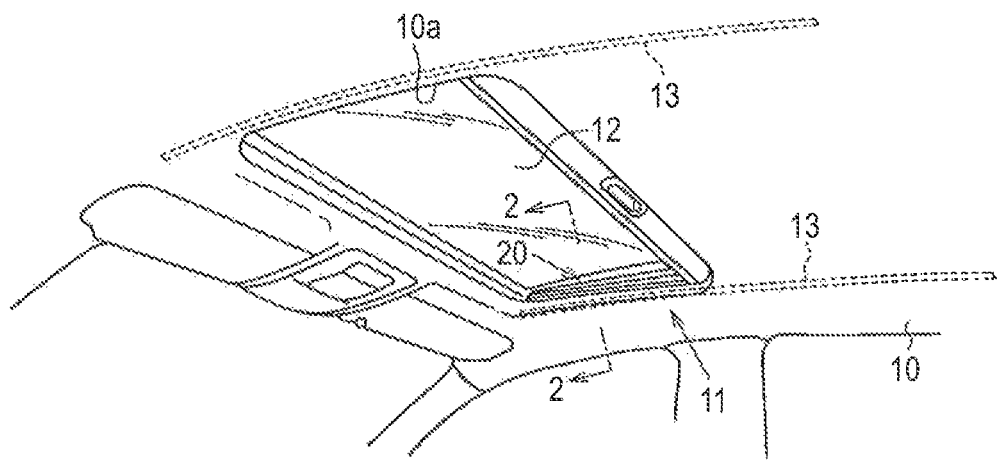
FIG. 1 is a perspective view of a sunroof apparatus of a first embodiment which is viewed obliquely from the lower side.

As illustrated in FIG. 1, a substantially rectangular opening 10a is formed in a roof 10 of a vehicle such as an automobile, and a sunroof apparatus 11 is mounded on the roof 10. The sunroof apparatus 11 includes a substantially rectangular movable panel 12 made of a glass plate or the like which opens and closes the opening 10a by moving in the forward and rearward direction. The sunroof apparatus 11 includes a pair of guide rails 13 which are respectively disposed in both edge portions of the opening 10a in the width direction of the vehicle. Each of the guide rails 13 is made of an extruded aluminum alloy or the like, and extends in the forward and rearward direction while having a uniform section in a longitudinal direction of the guide rail 13.

Figure 2:
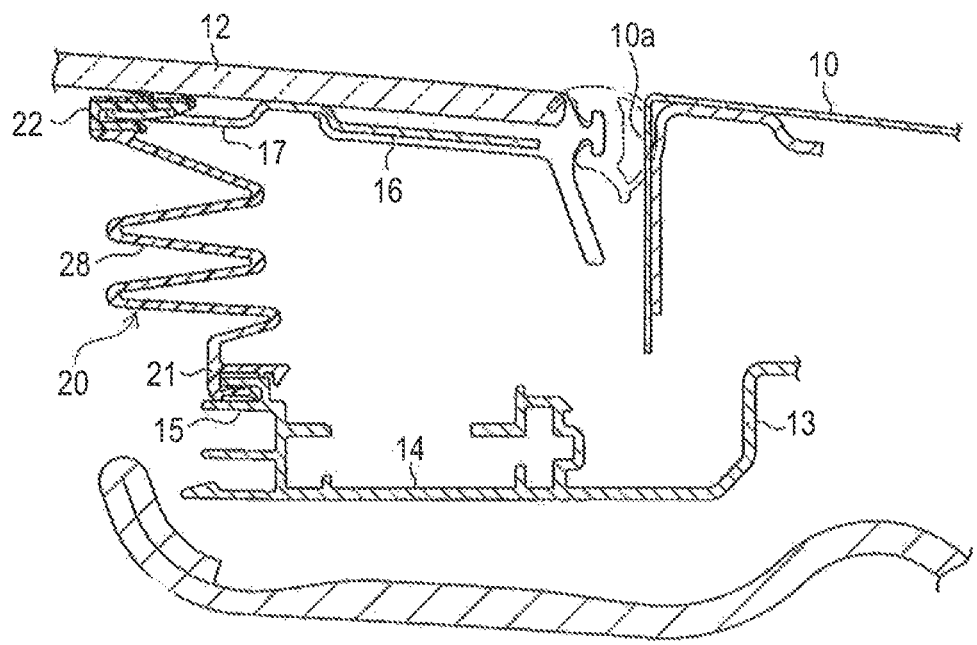
FIG. 2 is a sectional view taken along line 2-2 in FIG. 1.

That is, as illustrated in FIG. 2, the guide rail 13 includes a first guide portion 14 having a substantially C-shaped section which opens upward, and a second guide portion 15 having a substantially inverted C-shaped section which is connected to an upper portion at a vehicle interior side end of the first guide portion 14, and opens toward the vehicle interior side. A suitable sliding member (not illustrated) is supported by the first guide portion 14 such that the sliding member can be slid in the forward and rearward direction. The sliding member is linked to each edge portion of the movable panel 12 in the width direction of the vehicle. If the sliding member is moved along the first guide portion 14 in the forward and rearward direction, the movable panel 12 is opened and closed. Specifically, if the sliding member is moved toward the front side of the vehicle in a fully closed state of the movable panel 12, the movable panel 12 is tilted upward in such a way that a rear portion of the movable panel 12 is turned upward around a front portion of the movable panel 12. Alternatively, if the sliding member is moved toward the rear side of the vehicle in the fully closed state, the movable panel 12 is tilted downward in such a way that the rear portion of the movable panel 12 is turned downward around the front portion. If the sliding member is further moved toward the rear side of the vehicle, the movable panel 12 is opened to a fully open state while a tilt-down state is maintained (referred to as a so-called inner sliding method).

An attachment panel 16, which is a substantially frame-shaped attachment member made of a steel plate, is fixedly attached to a lower surface of the movable panel 12 such that the attachment panel 16 is disposed along an outer circumferential edge portion of the movable panel 12. The movable panel 12 is linked to the sliding member in a vehicle exterior side portion of the attachment panel 16 positioned on the upper side of the first guide portion 14.

Figure 3:
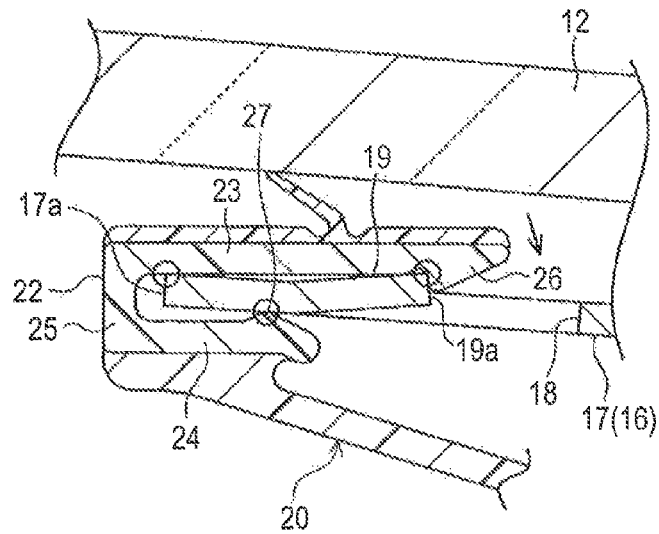
FIG. 3 is an enlarged view in FIG. 2.

A vehicle interior side end portion of the attachment panel 16 forms a substantially long flange 17 that extends in the forward and rearward direction (direction perpendicular to the sheet of FIG. 2). As illustrated in FIG. 3, a vehicle interior side end of the flange 17 is a free end. The flange 17 extends toward the vehicle interior side while being spaced away from the movable panel 12 in the height direction of the vehicle. An attachment hole 18 is formed in a vehicle interior side portion of the flange 17, and is an attachment recessed portion that opens (is recessed) in the height direction of the vehicle. A middle portion of a vehicle interior side inner wall surface of the attachment hole 18 protrudes toward the vehicle exterior side relative to both end portions of the vehicle interior side inner wall surface in the forward and rearward direction. A cut and lifted piece 19 is formed in the flange 17, and is inclined obliquely upward such that the middle portion of the vehicle interior side inner wall surface of the attachment hole 18 in the forward and rearward direction is positioned higher than the position of both end portions of the vehicle interior side inner wall surface of the attachment hole 18 in the forward and rearward direction. Naturally, the cut and lifted piece 19 forms a portion of the attachment hole 18 (inner wall surface). Multiple (for example, two) attachment holes 18 (the cut and lifted pieces 19) are formed while being spaced away from each other in the forward and rearward direction.

As illustrated in FIG. 2, a garnish 20 acting as a shielding body is interposed between the flange 17 and the second guide portion 15. The garnish 20 is made of extruded resin, and extends in the forward and rearward direction while having a uniform section in a longitudinal direction of the garnish 20. A lower end portion of the garnish 20 forms an engagement portion 21 having a substantially inverse C-shaped section which opens toward the vehicle exterior side. Naturally, the engagement portion 21 extends in the forward and rearward direction. The garnish 20 is supported by the second guide portion 15 such that the garnish 20 can be slid in the forward and rearward direction in a state where the engagement portion 21 and the second guide portion 15 are engaged with each other.

In contrast, an upper end portion of the garnish 20 forms an attachment portion 22 having a substantially inverse C-shaped section which opens toward the vehicle exterior side. Naturally, the attachment portion 22 extends in the forward and rearward direction. As illustrated in FIG. 3, the attachment portion 22 includes a first interposing piece 23 and a second interposing piece 24 that are a pair of interposing pieces which extend substantially parallel to each other in the width direction of the vehicle while being spaced away from each other in the height direction of the vehicle, and between which the flange 17 is interposed; and a connection wall 25 through which respective vehicle interior side ends of the first interposing piece 23 and the second interposing piece 24 are connected to each other in the height direction of the vehicle. The protruding length of the first interposing piece 23 toward the vehicle exterior side, which is positioned on the upper side, is set to be larger than that of the second interposing piece 24 positioned on the lower side. A tip end portion of the first interposing piece 23 positioned closer to the vehicle exterior side than a tip end (vehicle exterior side end) of the cut and lifted piece 19. A retaining claw 26 having a substantially triangular section is formed in the tip end portion of the first interposing piece 23 such that the retaining claw 26 is positioned closer to the vehicle exterior side than the cut and lifted piece 19, and protrudes downward so as to cover a tip end surface 19a of the cut and lifted piece 19. Naturally, the retaining claw 26 extends in the forward and rearward direction.

A projection 27 having a substantially triangular section is formed in a tip end portion (vehicle exterior side end portion) of the second interposing piece 24, and protrudes upward such that the projection 27 is in contact (line contact)

with a lower surface of the flange 17. Naturally, the projection 27 extends in the forward and rearward direction. Since the projection 27 is in contact (press contact) with the lower surface of the flange 17, the first interposing piece 23 is pulled downward toward the flange 17 such that a gap between the first interposing piece 23 and the flange 17 in the height direction of the vehicle is closed. Since the height of a vehicle interior side end surface 17a of the flange 17 is set to be different from that of the tip end surface 19a at the position of the cut and lifted piece 19 in the forward and rearward direction, a lower surface of the first interposing piece 23 is normally in contact (line contact) with the flange 17 at two points which are an upper end of the tip end surface 19a and an upper end of the vehicle interior side end surface 17a.

That is, in a sectional (cross-sectional) view, the attachment portion 22 is in contact with the flange 17 at three points (for the sake of convenience, illustrated by circle marks) which are two points on the first interposing piece 23 and one point on the second interposing piece 24 (projection 27). At this time, the retaining claw 26 is latched onto the tip end surface 19a in a state where the retaining claw 26 faces the tip end surface 19a in the width direction of the vehicle. That is, the attachment portion 22 is retained by the flange 17 in the width direction of the vehicle via a latch allowance between the retaining claw 26 and the tip end surface 19a in the height direction of the vehicle. In other words, since the projection 27 is in contact (press contact) with the lower surface of the flange 17, as illustrated by an arrow, the attachment portion 22 is turned (tipped) in a direction in which the retaining claw 26 is normally latched onto the tip end surface 19a of the cut and lifted piece 19. Accordingly, the latch allowance between the retaining claw 26 and the tip end surface 19a in the height direction of the vehicle is normally ensured.

A lower end of the retaining claw 26 is in contact with an upper surface of the flange 17 at positions in the forward and rearward direction where the cut and lifted pieces 19 are not present; however, since the retaining claw 26 basically protrudes downward in the range of a distance to the upper surface of the flange 17, there is a slight or no deformation to the first interposing piece 23.

As illustrated in FIG. 2, respective vehicle interior side ends of the engagement portion 21 and the attachment portion 22 are connected to each other via a bellows portion 28 that can be extended and contracted in the height direction of the vehicle. The bellows portion 28 is extended following a tilt-up operation of the movable panel 12, and is contracted following a tilt-down operation of the movable panel 12. A portion (the first guide portion 14, the sliding member which is slid against the first guide portion 14, and the like) of the sunroof apparatus 11, which is positioned closer to the vehicle exterior side than the garnish 20, is shielded from the vehicle interior side by the garnish 20.

Hereinafter, an operation of the embodiment will be described.

The garnish 20 interposed between the flange 17 and the second guide portion 15 is positioned closer to the vehicle interior side than the second guide portion 15, and covers a gap therebetween. During an opening and closing operation of the movable panel 12, the garnish 20 is moved integrally with the movable panel 12 while being slid against the second guide portion 15. That is, if the attachment portion 22 is moved following the opening and closing operation of the movable panel 12, the engagement portion 21 is moved along the second guide portion 15 via the bellows portion 28.

As illustrated in FIG. 3, in a sectional (cross-sectional) view, the attachment portion 22 of the garnish 20 is in contact with the flange 17 at the three points which are the two points on the first interposing piece 23 and the one point on the second interposing piece 24 (the projection 27). For this reason, a change in the attachment posture of the attachment portion 22 (garnish 20) caused by a variation in the product dimensions of the garnish 20 or variations of mating components (the attachment panel 16 and the like), or a change in the posture of the attachment portion 22 (garnish 20), which may occur during the opening and closing operation of the movable panel 12 is prevented.

As described above, according to the embodiment, it is possible to obtain the following effects.

(1) In the embodiment, a change in the attachment posture of the attachment portion 22 caused by a variation in the product dimensions of the garnish 20 or variations of mating components (the attachment panel 16 and the like), or a change in the posture of the attachment portion 22, which may occur during the opening and closing operation of the movable panel 12 is prevented. Naturally, the posture of the retaining claw 26 relative to the cut and lifted piece 19 is also stabilized. As a result, it is possible to reduce a change (reduction) in the latch allowance between the tip end surface 19a of the cut and lifted piece 19 and the retaining claw 26 in the height direction of the vehicle. It is possible to prevent the falling off of the attachment portion 22 (garnish 20) from the flange 17 (movable panel 12).

Since the garnish 20 is in contact with the flange 17 at the three points, even if there is a variation in the accuracy of components, a gap between the flange 17 and the attachment portion 22 in the height direction of the vehicle is not formed. For this reason, it is possible to prevent the turning of the attachment portion 22 in a distance of the gap, that is, the tipping of the attachment portion 22, or the occurrence of abnormal sounds resulting from interference between the attachment portion 22 and the flange 17 caused by the tipping.

(2) In the embodiment, since the projection 27 is formed over the entire length of the garnish 20 in the forward and rearward direction, it is possible to mold the projection 27 following the extrusion molding of the garnish 20, and to reduce man hours in manufacturing and a cost.

Second Embodiment

Hereinafter, a sunroof apparatus of a second embodiment will be described. Since the second embodiment has a changed configuration in that pressure is applied via the three contacts between the garnish (attachment portion) and the flange of the first embodiment, detailed description of the same parts will be omitted. The same digits as those in the first embodiment are assigned to the tens and following places of reference numbers of configuration elements of the second embodiment which have the same functions as those in the first embodiment.

Figure 4:
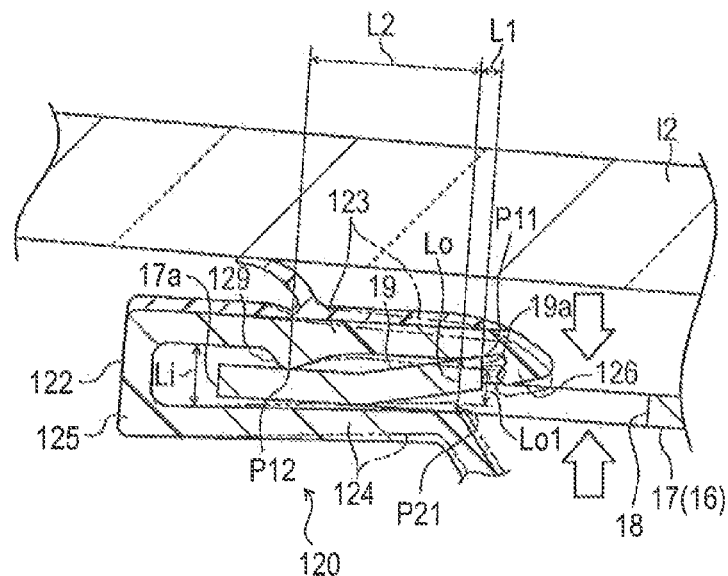
FIG. 4 is a sectional view of a sunroof apparatus of a second embodiment.

As illustrated in FIG. 4, similar to the attachment portion 22, an attachment portion 122 of a garnish 120 of the embodiment includes a first interposing piece 123; a second interposing piece 124; a connection wall 125; and a retaining claw 126. A separation distance between the first interposing piece 123 and the second interposing piece 124 in the height direction of the vehicle is set such that the separation distance is reduced toward the retaining claw 126 in the width direction of the vehicle. For example, a separation distance Lo at a vehicle exterior side end of the second interposing piece 124 is set to be shorter than a separation distance Li at the position of the vehicle interior side end surface 17a of the flange 17.

As illustrated by an alternate one long and two short dashes line in FIG. 4, in a case where the flange 17 is in a free state where the flange is not interposed between the first interposing piece 123 and the second interposing piece 124, the overall separation distance between the first interposing piece 123 and the second interposing piece 124 in the height direction of the vehicle is set to be shorter than that in a case where the flange 17 is not in a free state. Accordingly, a separation distance Lo1 at the vehicle exterior side end of the second interposing piece 124 is shorter than the separation distance Lo.

A projection 129 having a substantially triangular section is formed in a middle portion of the second interposing piece 124 in the width direction of the vehicle which is positioned closer to the vehicle interior side than the cut and lifted piece 19. The projection 129 protrudes downward, and is in contact (line contact) with the upper surface of the flange 17. Naturally, the projection 129 extends in the forward and rearward direction.

Hereinafter, an operation of the embodiment will be described.

As described above, the separation distance between the first interposing piece 123 and the second interposing piece 124 in the height direction of the vehicle is set such that the separation distance is reduced toward the retaining claw 126 in the width direction of the vehicle. In a case where the flange 17 is in a free state where the flange is not interposed between the first interposing piece 123 and the second interposing piece 124, the separation distance therebetween is set to be shorter than that in a case where the flange 17 is not in a free state. The height of the vehicle interior side end surface 17a of the flange 17 is set to be different from that of the tip end surface 19a at the position of the cut and lifted piece 19 in the forward and rearward direction. Accordingly, if the flange 17 is interposed between the first interposing piece 123 and the second interposing piece 124, a lower surface of the first interposing piece 123 is in contact (line contact) with the upper end of the tip end surface 19a at one point while normally applying pressure to the flange 17, and a vehicle exterior side end of an upper surface of the second interposing piece 124 is in contact (line contact) with the flange 17 at one point while normally applying pressure to the flange 17. Due to reaction force generated by the contact, a lower end of the projection 129 of the lower surface of the first interposing piece 123 is in contact (line contact) with the flange 17 at one point while normally applying pressure to the flange 17. That is, in a sectional (cross-sectional) view, while applying pressure to the flange 17, the attachment portion 122 is in contact with the flange 17 at three points which are two points P11 and P12 on the first interposing piece 123 (projection 129) and one point P21 on the second interposing piece 124.

At this time, the retaining claw 126 is latched on the tip end surface 19a in a state where the retaining claw 126 faces the tip end surface 19a in the width direction of the vehicle. That is, the attachment portion 122 is retained by the flange 17 in the width direction of the vehicle via a latch allowance between the retaining claw 126 and the tip end surface 19a in the height direction of the vehicle.

The one point P21 on the second interposing piece 124 is disposed closer to the retaining claw 126 than a central point between the two points P11 and P12 on the first interposing piece 123. That is, a separation distance L1 between the points P11 and P21 is set to be shorter than a separation distance L2 between the points P12 and P21 in the width direction of the vehicle.

As described above, according to the embodiment, it is possible to obtain the following effects in addition to the effect (1) of the first embodiment.

Figure 5:
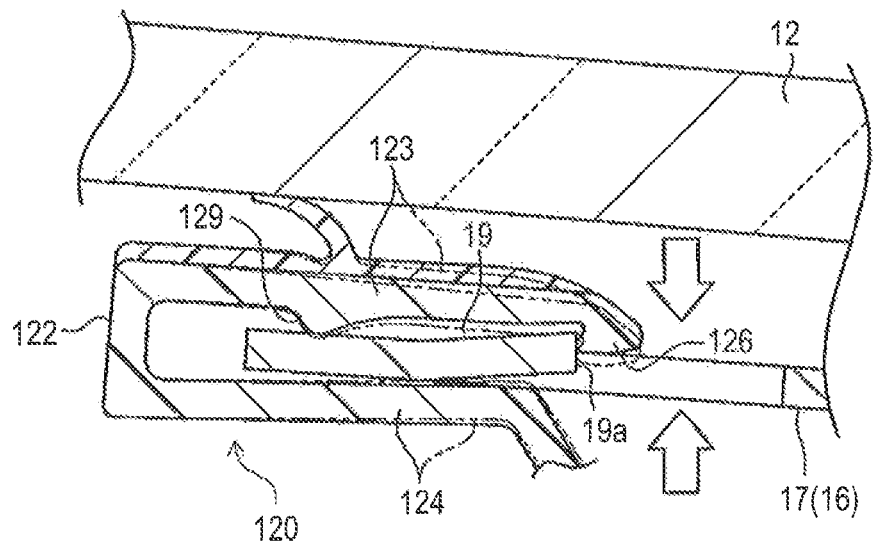
FIG. 5 is a sectional view illustrating an operation in the second embodiment.

(1) In the embodiment, in a sectional (cross-sectional) view, while applying pressure to the flange 17, the garnish 120 is in contact with the flange 17 at three points which are two points on the first interposing piece 123 (projection 129) and one point on the second interposing piece 124. As a result, as illustrated in FIG. 5, even if there is a variation in the posture of the flange 17 interposed between the first interposing piece 123 and the second interposing piece 124 which is caused by a variation in product dimensions, since the first interposing piece 123 and the second interposing piece 124 follow the flange 17 in the range of the pressure, it is possible to more reliably maintain a state of contact between the first interposing piece 123 and the flange 17 and between the second interposing piece 124 and the flange 17. It is possible to further reduce a change (reduction) in a latch allowance between the tip end surface 19a of the cut and lifted piece 19 and the retaining claw 126 in the height direction of the vehicle. It is possible to further prevent the falling off of the attachment portion 122 (garnish 120) from the flange 17 (movable panel 12).

(2) In the embodiment, the one point P21 on the second interposing piece 124 is disposed closer to the retaining claw 126 than the central point between the two points P11 and P12 on the first interposing piece 123. As a result, force reducing a change (reduction) in the latch allowance between the tip end surface 19a of the cut and lifted piece 19 and the retaining claw 126 in the height direction of the vehicle can be efficiently generated at the point P11 (close to the retaining claw 126) of the two points P11 and P12 on the first interposing piece 123, and at the one point P21 on the second interposing piece 124. Since it is possible to further reduce pressure applied to the flange 17 when the two points P11 and P12 on the first interposing piece 123 and the like are in contact with the flange 17, it is possible to further improve assemblability, that is, the ease of interposing the flange 17 between the first interposing piece 123 and the second interposing piece 124.

(3) In the embodiment, the separation distance between the first interposing piece 123 and the second interposing piece 124 in the height direction of the vehicle is set such that the separation distance is reduced toward the retaining claw 126 in the width direction of the vehicle. In a case where the flange 17 is in a free state where the flange is not interposed between the first interposing piece 123 and the second interposing piece 124, the separation distance therebetween is set to be shorter than that in a case where the flange 17 is not in a free state. Accordingly, if the flange 17 is interposed between the first interposing piece 123 and the second interposing piece 124, the first interposing piece 123 and the second interposing piece 124 are pressed by the flange 17, and are elastically deformed such that a separation distance between the one point P21 on the second interposing piece 124 and the point P11 (close to the retaining claw 126) of the two points P11 and P12 on the first interposing piece 123 in the height direction of the vehicle increases. As a result, the point P12 (positioned away from the retaining claw 126) of the two points P11 and P12 on the first interposing piece 123 can be more reliably brought into contact (press contact) with the flange 17 by reaction force generated by the elastic deformation. It is possible to further reduce a change (reduction) in the latch allowance between the tip end surface 19a of the cut and lifted piece 19 and the retaining claw 126 in the height direction of the vehicle. It is possible to further prevent the falling off of the attachment portion 122 (garnish 120) from the flange 17 (movable panel 12).

(4) In the embodiment, since the projection 129 is formed over the entire length of the garnish 120 in the forward and rearward direction, it is possible to mold the projection 129 following the extrusion molding of the garnish 120, and to reduce man hours in manufacturing and a cost.

The embodiments may be changed in the following manner.

Figure 6:
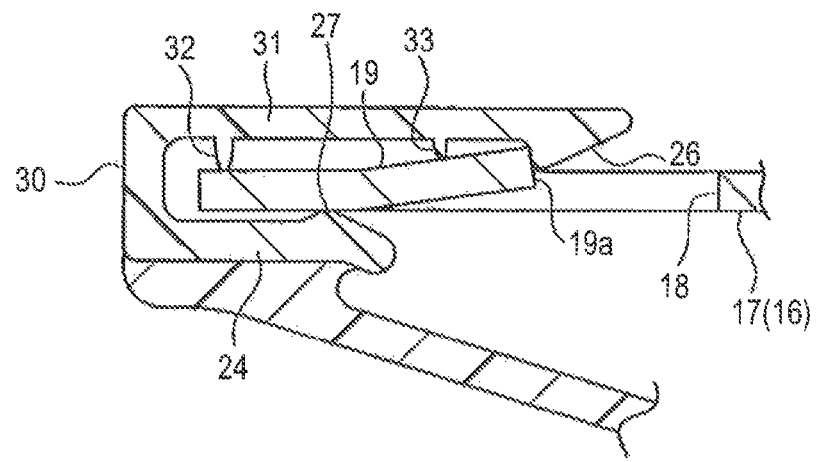
FIG. 6 is a sectional view of a sunroof apparatus of a modification embodiment.

- As illustrated in FIG. 6, a first projection 32 and a second projection 33 may be formed in a first interposing piece 31 of an attachment portion 30 equivalent to the attachment portion 22 of the first embodiment such that the first projection 32 and the second projection 33 are positioned on both sides of the projection 27 with the projection 27 interposed therebetween in the width direction of the vehicle. The first projection 32 and the second projection 33 protrude downward. In this case, the first interposing piece 31 is normally in contact (line contact) with the upper surface of the flange 17 at two points, which are the first projection 32 and the second projection 33, at the position of the cut and lifted piece 19 in the forward and rearward direction. As a result, even with such a change, it is possible to obtain the same effects as those of the embodiment.

If contact between the second projection 33 and the upper surface of the flange 17 is ensured, and a latch allowance between the retaining claw 26 and the inner wall surface of the attachment hole 18 in the height direction of the vehicle is ensured, the cut and lifted piece 19 may be omitted. A dispositional relationship between the first interposing piece 31 and the second interposing piece 24 in the height direction of the vehicle may be reversed. That is, the first interposing piece 31 and the second interposing piece 24 may be respectively disposed on the lower side and the upper side of the flange 17 in a state where the flange 17 is interposed therebetween. In this case, a cut and lifted piece (19) which is inclined obliquely downward is preferably formed.

Figure 7:
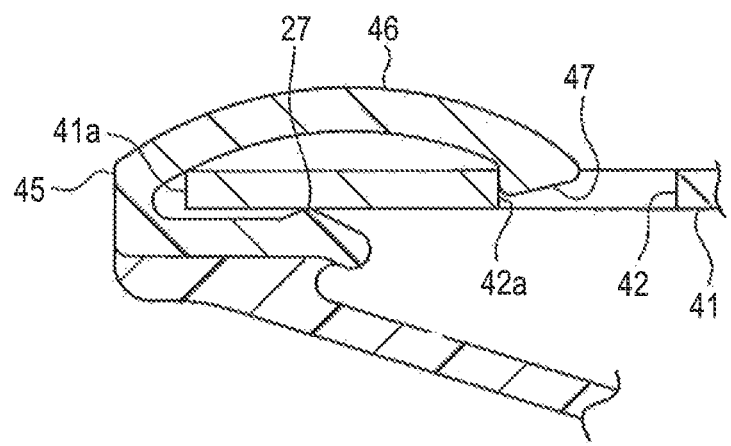
FIG. 7 is a sectional view of a sunroof apparatus of another modification embodiment.
Figure 8A:
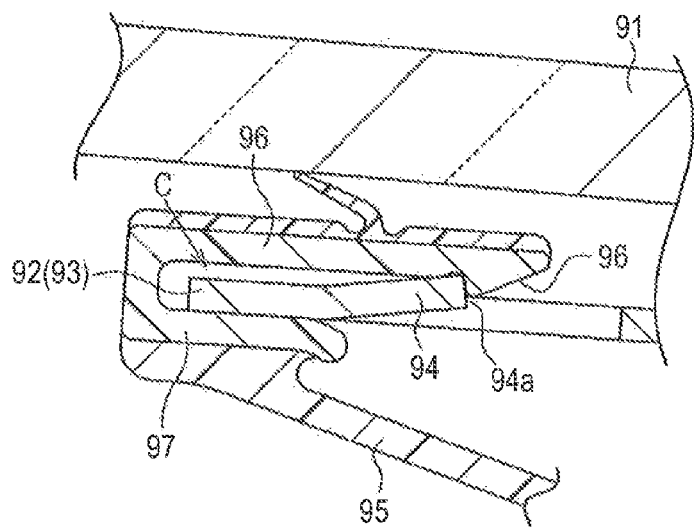
FIGS. 8A and 8B show sectional views of a sunroof apparatus in the related art.
Figure 8B:
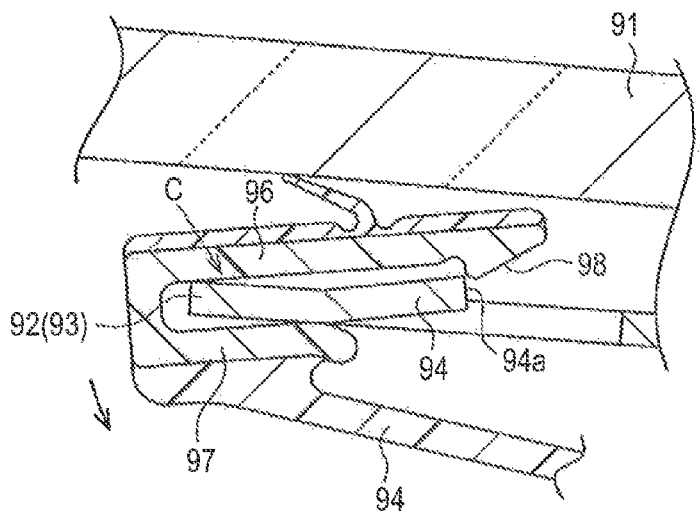

As illustrated in FIG. 7, a flange 41, in which an attachment hole 42 is formed as an attachment recessed portion in which a cut and lifted piece (19) is not formed, may be used in the configuration of the first embodiment. An attachment portion 45 equivalent to the attachment portion 22 may be provided with a first interposing piece 46 having a substantially bow-shaped section which is convex upward. A retaining claw 47 having a substantially triangular section is formed in a tip end portion of the first interposing piece 46 such that the retaining claw 47 is positioned closer to the vehicle exterior side than a vehicle interior side inner wall surface 42a of the attachment hole 42, and protrudes downward so as to cover the inner wall surface 42a. In this case, since both end portions of the first interposing piece 46 are positioned at low positions, a lower surface of the first interposing piece 46 is normally in contact (line contact) with the flange 41 at two points which are an upper end of a vehicle interior side end surface 41a of the flange 41 and an upper end of the inner wall surface 42a. As a result, even with such a change, it is possible to obtain the same effects as those of the first embodiment.

A dispositional relationship between the first interposing piece 46 and the second interposing piece 24 in the height direction of the vehicle may be reversed. That is, the first interposing piece 46 and the second interposing piece 24 may be respectively disposed on the lower side and the upper side of the flange 17 in a state where the flange 17 is interposed therebetween.

In the first embodiment, the garnish 20 may be molded via methods other than extrusion molding. In this case, the projection 27, the retaining claw 26, and the like may not extend over the entire length of the garnish 20 in the forward and rearward direction.

In the second embodiment, the separation distance between the first interposing piece 123 and the second interposing piece 124 in the height direction of the vehicle may not be set such that the separation distance is reduced toward the retaining claw 126 in the width direction of the vehicle. Alternatively, In a case where the flange 17 is in a free state where the flange is not interposed between the first interposing piece 123 and the second interposing piece 124, the separation distance therebetween in the height direction of the vehicle may not be set to be shorter than that in a case where the flange 17 is not in a free state.

In the second embodiment, the one point P21 on the second interposing piece 124 may not be disposed closer to the retaining claw 126 than the central point between the two points P11 and P12 on the first interposing piece 123.

In the second embodiment, the garnish 120 may be molded via methods other than extrusion molding. In this case, the projection 129, the retaining claw 126, and the like may not extend over the entire length of the garnish 120 in the forward and rearward direction.

In each of the embodiments, instead of the attachment hole 18 or 42, the embodiments may adopt an attachment hole which is an attachment recessed portion which does not pass through in the height direction of the vehicle. In this case, even if the attachment hole is formed over the entire length of the flange 17 or 41 in the forward and rearward direction, the continuity of the flanges 17 or 41 is maintained. Since the retaining claw 26, 47, or 126 is latched onto an inner wall surface of the attachment hole over the entire length of the retaining claw 26, 47, or 126 in the forward and rearward direction while a state of contact between the attachment portion 22, 30, 45, or 122 and the flange 17 or 41 at the three points is maintained, the falling off of the attachment portion 22, 30, 45, or 122 from the flange 17 or 41 is prevented.

In each of the embodiments, respective dispositional relationships between the first interposing pieces 23 and 123 and the second interposing pieces 24 and 124 in the height direction of the vehicle may be reversed. That is, the first interposing pieces 23 and 123 and the second interposing pieces 24 and 124 may be respectively disposed on the lower side and the upper side of the flange 17 in a state where the flange 17 is interposed therebetween. In this case, a cut and lifted piece (19) which is inclined obliquely downward is preferably formed.

In each of the embodiments, in the garnishes 20 and 120, any one of the engagement portion 21, the attachment portions 22 and 122, and the bellows portion 28 may be molded via extrusion molding, and the remainders may be molded via outsert molding.

A sunroof apparatus according to an aspect of this disclosure includes: a movable panel adapted to open and close an opening formed in a roof of a vehicle; a guide rail which is provided in each edge portion of the opening in a width direction of the vehicle such that the guide rail is positioned below the movable panel in a height direction of the vehicle; an attachment member which is fixed to the movable panel, includes a flange extending toward an interior side in the width direction in each edge portion in the width direction of the vehicle, in which an attachment recessed portion, which is recessed in the height direction of the vehicle, is formed in the flange; and a shielding body that includes a pair of interposing pieces which are provided to extend in a forward and rearward direction of the vehicle, are slidably engaged with the guide rail, and extend in the width direction of the vehicle while being spaced away from each other in the height direction of the vehicle, and between which the flange is interposed, and a connection wall through which respective interior side ends of both of the interposing pieces in the width direction of the vehicle are connected to each other in the height direction of the vehicle, and in which a retaining claw is formed in a tip end portion of a first interposing piece, which is one of both of the interposing pieces, such that the retaining claw protrudes in the height direction of the vehicle and is latched onto an inner wall surface of the attachment recessed portion. In a sectional view, the shielding body is in contact with the flange at two points on the first interposing piece and at one point positioned in a middle area between the two points in the width direction of the vehicle on a second interposing piece which is the other of both of the interposing pieces.

In this configuration, since the flange is interposed between both of the interposing pieces in the height direction of the vehicle, and the retaining claw is latched onto the inner wall surface of the attachment recessed portion, the shielding body is retained by and fixed to the flange. At this time, since in a sectional view, the shielding body is in contact with the flange at three points which are two points on the first interposing piece and one point on the second interposing piece, a change in the posture of the shielding body, which may occur during an opening and closing operation of the movable panel is prevented. As a result, it is possible to reduce a change (reduction) in a latch allowance between the retaining claw and the inner wall surface of the attachment recessed portion in the height direction of the vehicle. It is possible to prevent the falling off of the shielding body from the flange (movable panel).

In the sunroof apparatus, it is preferable that the shielding body is in contact with the flange at the two points on the first interposing piece and at the one point on the second interposing piece while applying pressure to the flange.

In this configuration, the shielding body is in contact with the flange at the two points on the first interposing piece and at the one point on the second interposing piece while applying pressure to the flange. As a result, even if there is a variation in the posture of the flange interposed between the first interposing piece and the second interposing piece which is caused by a variation in product dimensions, since the first interposing piece and the second interposing piece follow the flange in the range of the pressure, it is possible to more reliably maintain a state of contact between the first interposing piece and the flange and between the second interposing piece and the flange.

In the sunroof apparatus, it is preferable that the one point on the second interposing piece is disposed closer to the retaining claw than a central point between the two points on the first interposing piece.

In this configuration, force reducing a change (reduction) in the latch allowance between the retaining claw and the inner wall surface of the attachment recessed portion in the height direction of the vehicle can be efficiently generated at one point (close to the retaining claw) of the two points on the first interposing piece, and at the one point on the second interposing piece.

In the sunroof apparatus, it is preferable that a separation distance between the first interposing piece and the second interposing piece in the height direction of the vehicle is set such that the separation distance is reduced toward the retaining claw in the width direction of the vehicle, and in a case where the flange is in a free state where the flange is not interposed therebetween, the separation distance is set to be shorter than that in a case where the flange is not in a free state.

In this configuration, if the flange is interposed between the first interposing piece and the second interposing piece, the first interposing piece and the second interposing piece are pressed by the flange, and are elastically deformed such that a separation distance between one point (close to the retaining claw) of the two points on the first interposing piece and the one point on the second interposing piece in the height direction of the vehicle increases. As a result, one point (positioned away from the retaining claw) of the two points on the first interposing piece can be more reliably brought into contact (press contact) with the flange by reaction force generated by the elastic deformation.

According to the aspect of this disclosure, it is possible to prevent the falling off of the shielding body from the movable panel.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sunroof apparatus comprising:
    a movable panel adapted to open and close an opening formed in a roof of a vehicle;
    a guide rail which is provided in each edge portion of the opening in a width direction of the vehicle such that the guide rail is positioned below the movable panel in a height direction of the vehicle;
    an attachment member which is fixed to the movable panel, includes a flange extending toward an interior side in the width direction in each edge portion in the width direction of the vehicle, in which an attachment recessed portion, which is recessed in the height direction of the vehicle, is formed in the flange; and
    a shielding body slidably engaged with the guide rail, wherein the shielding body includes a pair of interposing pieces which are provided to extend in a forward and rearward direction of the vehicle and extend in the width direction of the vehicle while being spaced away from each other in the height direction of the vehicle, and between which the flange is interposed, and a connection wall through which respective interior side ends of both of the interposing pieces in the width direction of the vehicle are connected to each other in the height direction of the vehicle, and in which a retaining claw is formed in a tip end portion of a first interposing piece, which is one of both of the interposing pieces, such that the retaining claw protrudes in the height direction of the vehicle and is latched onto an inner wall surface of the attachment recessed portion, wherein in a sectional view, the shielding body is in contact with the flange at two points on the first interposing piece and at one point positioned in a middle area between the two points in the width direction of the vehicle on a second interposing piece which is the other of both of the interposing pieces.

2. The sunroof apparatus according to claim 1, wherein the shielding body is in contact with the flange at the two points on the first interposing piece and at the one point on the second interposing piece while applying pressure to the flange.

3. The sunroof apparatus according to claim 2, wherein the one point on the second interposing piece is disposed closer to the retaining claw than a central point on an imaginary line between the two points on the first interposing piece.

4. The sunroof apparatus according to claim 2, wherein a separation distance between the first interposing piece and the second interposing piece in the height direction of the vehicle is set such that the separation distance is reduced toward the retaining claw in the width direction of the vehicle, and in a case where the flange is in a free state where the flange is not interposed therebetween, the separation distance is set to be shorter than that in a case where the flange is not in a free state.

5. The sunroof apparatus according to claim 3, wherein a separation distance between the first interposing piece and the second interposing piece in the height direction of the vehicle is set such that the separation distance is reduced toward the retaining claw in the width direction of the vehicle, and in a case where the flange is in a free state where the flange is not interposed therebetween, the separation distance is set to be shorter than that in a case where the flange is not in a free state.

* * * * *